United States Patent [19]
Kaltz

[11] 3,849,851
[45] Nov. 26, 1974

[54] METHOD OF TREATING WELDED HEAT TRANSFER MEMBERS TO ELIMINATE WELD SCALE

[75] Inventor: Kenneth L. Kaltz, Edgefield, S.C.

[73] Assignee: Tranter Manufacturing, Inc., Lansing, Mich.

[22] Filed: Sept. 27, 1972

[21] Appl. No.: 292,726

[52] U.S. Cl. ............... 29/494, 29/488, 29/157.3 C, 29/157.4
[51] Int. Cl. ..................... B23k 31/02, B23k 35/38
[58] Field of Search..... 29/157.4, 488, 494, 157.3 C

[56] References Cited
UNITED STATES PATENTS

| | | | |
|---|---|---|---|
| 1,326,912 | 1/1920 | Cary | 29/488 |
| 2,965,963 | 12/1960 | Batz et al. | 29/488 X |
| 3,069,766 | 12/1962 | Rush | 29/488 |
| 3,153,447 | 10/1964 | Yoder et al. | 165/170 |
| 3,367,414 | 1/1968 | Brown et al. | 29/157.4 X |
| 3,496,629 | 2/1970 | Martucci et al. | 29/157.4 UX |
| 3,589,440 | 7/1971 | Friedrich | 29/157.4 X |

OTHER PUBLICATIONS

Brazing Manual, prepared by American Welding Society Committee on Brazing and Soldering, copyright 1963, pp. 55–62, 81–85.
Metals Handbook, Vol. 2, Heat Treating, Cleaning and Finishing, ASM Handbook Committee, Taylor Lyman Editor, copyright 1964, pp. 364–368.

Primary Examiner—Andrew R. Juhasz
Assistant Examiner—Ronald J. Shore
Attorney, Agent, or Firm—Whittemore, Hulbert & Belknap

[57] ABSTRACT

An interior surface of a welded plate-type coolant-circulating heat transfer unit, as in a header thereof, is shot or grit-blasted for a time interval sufficient not only to remove therefrom oil, grease and the like, but in particular any accumulation of oxidized scale, thus to thoroughly clean and restore said surface to a so-called "white metal condition," free of external contamination, prior to welding. The shot or grit-blasting is such as to roughen the surface sufficiently to increase its effectively exposed area by 50–60 percent as an important intended incident to its cleaning. Welding of thus cleaned and mated parts, for example, at top and bottom zones where throated circulatory plate components of the unit straddle and communicate with the interior of its headers, is then performed at an optimum and minimum necessary temperature, and for a minimum necessary time interval, correspondingly minimizing oxide formation due to welding. To the same end, and optionally by preference, the presence of ambient oxygen is much minimized, as by welding in an argon-charged internal atmosphere to purge the oxygen.

10 Claims, 5 Drawing Figures

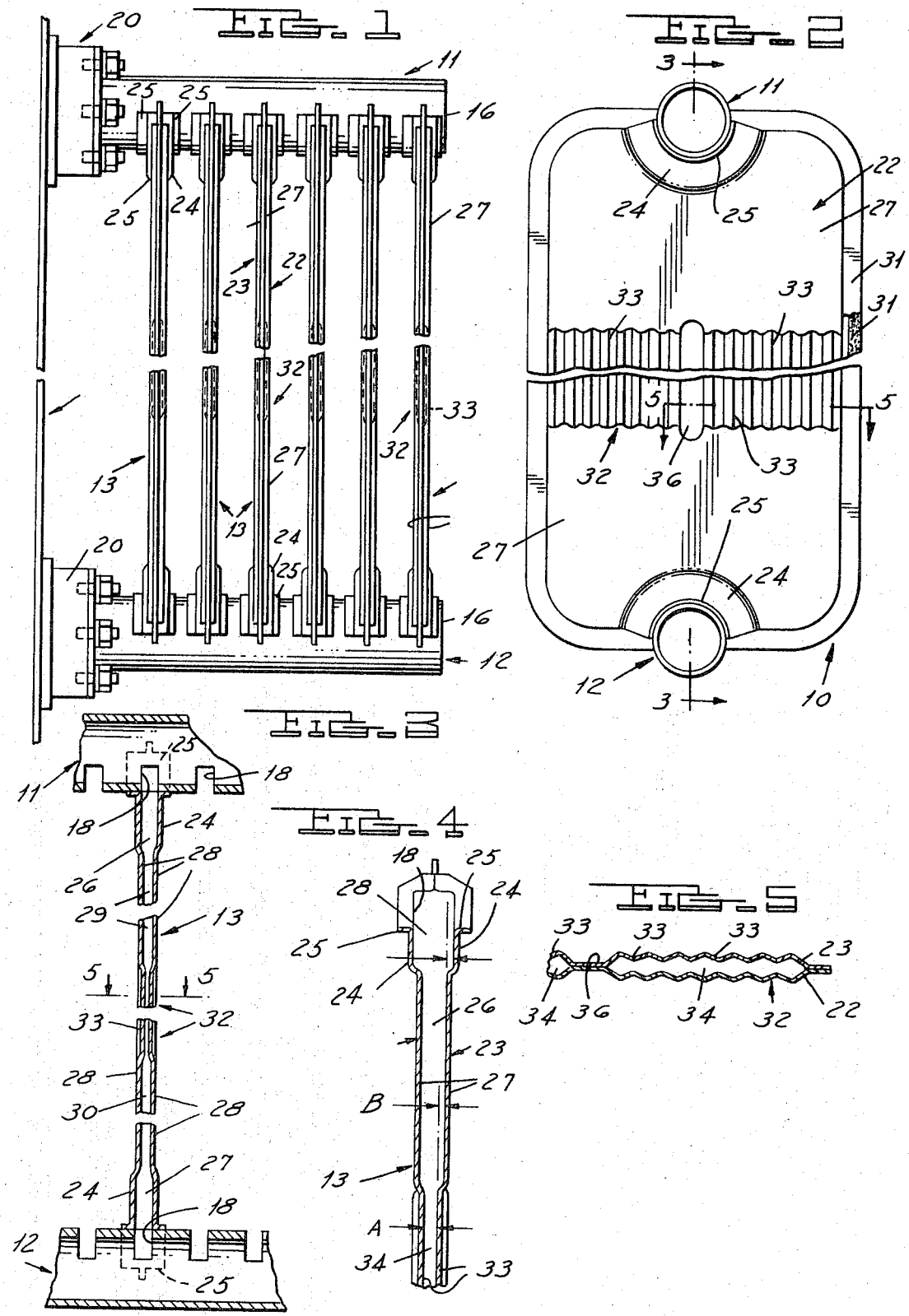

3,849,851

METHOD OF TREATING WELDED HEAT TRANSFER MEMBERS TO ELIMINATE WELD SCALE

BACKGROUND OF THE INVENTION

1. Field of the Invention

The invention has application in the production in general of welded surface unions which are detrimentally affected, in regard to the end use of the welded product, as well as the quality of the welds, by accumulations of foreign matter, especially significant build-ups of scale or metal oxide in a degree to be loose and flaky in nature, hence, if dislodged, apt to give rise to faulty operation of the product, for example, in regard to short circuiting, clogging, etc., in the specific case of an external transformer oil cooler in which the oil coolant is circulated through the interior of the transfer unit.

More particularly, the method of the invention, and the improved effect which is its result, are to be employed in the production of lap-welded heat transfer units comparable to those illustrated and described in the patent to Yoder et al., U.S. Pat. No. 3,153,447 of Oct. 20, 1964 of common ownership herewith. These typically involve an arrangement of like hollow, stamped, generally flat sheet metal heat-transfer plates weld-connected in a spaced succession thereof to opposed liquid supply and discharge headers, each constituted by a relatively large diameteter pipe through which outflow and return flow of coolant oil are established in relation to the interior of an oil-cooled electrical transformer. Yet it is to be understood that the method is applicable in the production of other generally related heat transfer units and, indeed, in the production of various sorts of composite weld-united product in which an unclean or significantly oxide-scaled surface is detrimental to a best functioning of the unit.

2. Description of the Prior Art

A search has revealed the following patents:

| Cooper | 2,149,253 | May 19, 1937 |
| Mazzagatti | 2,856,739 | May 28, 1957 |
| Physioc | 3,276,234 | July 11, 1963 |

None of these shows or suggests the method of the present invention. Cooper teaches the idea of shot blasting an iron or steel surface, using corrosion-resistant pellets, to impart a surface coating to the corrosive ferrous surface; while in the case of Physioc, the shot blasting of stainless parts is at a low temperature to increase tensile strength. The patent to Mazzagatti merely shows versions of treatment of radiation detectors, in which argon or helium are introduced to or against a detector-containing housing to prevent the entry of air during a seam soldering or welding operation. This phase is not coupled with a preliminary treatment, whether by shot blasting or otherwise.

SUMMARY OF THE INVENTION

In the typical prior manufacture of welded header-type heat exchange plate units of the sort instanced above, it has been found that an incrustation of oxide or scale is commonly present on the inner wall of the header, which build-up may range from a minimum, and usually acceptable, discoloration appearance to a maximum and thoroughly inacceptable condition amounting to a loose and flaking scaling. This is highly detrimental in intended use of the unit as an adjunct of electrical apparatus, viz, transformers, particularly those operating at high voltage, hence subject to short circuiting occasioned by scale often dislodged in shipment or otherwise. The same is true in regard to other loose foreign substances of one sort or another.

Accordingly, manufacturers of such exchangers have gone to great lengths to cleanse the interior of the product. In the simple case of water or dampness, this is done by baking, vacuumizing, etc. In the case of oxide and other like incrustations, pickling or wire brushing is resorted to, but never with fully hoped for results. Cleaning of exposed surface prior to welding of all contaminants such as rust scale, oil, grease and dirt is thus a leading requisite to reducing or eliminating weld scale accumulation. Satisfying this need by shot-blasting is therefore a major consideration in the practice of the method of the invention.

The factor of the temperature of the surface at welding is another important one, recognized as such by the industry, for the higher the temperature the more oxide that is formed in welding. This is also true in regard to the welding time; the longer the surface is at temperature the greater the chance for oxide residue formation. Accordingly, conventional practice has been to avoid very high welding temperature and time, yet recognizing that established minimum temperatures and times are of course essential to an efficient weld.

Still another factor contributing to weld scale is the available free oxygen in the ambient weld atmosphere. The more that is present the greater the scale formation build-up. Hence, as a somewhat subordinate but still significant contributing factor in the method of the present invention, an inert gas purge of the atmosphere at the weld is contemplated.

BRIEF DESCRIPTION OF THE DRAWING

FIG. 1 is a side elevational view, partially broken away, of a preferred embodiment of the heat transfer unit of the invention, featuring enlarged mouth and throat manifolding of the welded plate assembly at opposite sides of a central, vertically rippled or corrugated zone;

FIG. 2 is an end elevation of the unit of FIG. 1;

FIG. 3 is a fragmentary view in vertical section on line 3—3 of FIG. 2;

FIG. 4 is an enlarged scale fragmentary view showing the successive weld flange, entry mouth, manifold throat and ripple features of a plate assembly according to this preferred embodiment, being in section similar to FIG. 3; and FIG. 5 is a fragmentary view in horizontal section on line 5—5 of FIGS. 2 and 3.

DESCRIPTION OF A PREFERRED EMBODIMENT

Referring to these figures, there is illustrated therein one embodiment of the invention for application to a transformer or like unit to be serviced by heat dissipative transfer of its circulating heat transfer unit. The unit is generally designated by the reference numeral 10 and is made up of three essential types of component. These are the upper and lower liquid supply and return conduits or headers 11, 12 respectively, and the welded plate type heat transfer members or assemblies 13, structural features of which will be described.

The headers 11, 12 are formed of tubular pipe or stock, of as light weight and wall thickness as is possible consistent with their function of coupling the unit to the apparatus to be serviced; and they may be of lighter material than would normally be employed, on account of the self-rigidifying and vibration-absorbing characteristics of the unit.

Headers 11, 12 are closed at one end wall 16 of each (FIG. 1), and their opposite ends are adapted to be attached by suitable coupling means, later referred to, of the serviced transformer or other apparatus, for circulation of the heat transfer liquid, usually a suitable grade of oil.

At suitably spaced points along the headers 11, 12 the bottom surface of the former and the upper surface of the latter are milled, punched or otherwise formed to provide slot-like openings, as at 18.

The individual plate assemblies, as generally designated 13, are applied to the upper intake and outlet headers 11, 12, respectively, in a straddling relation to the slots 18 of said headers; and the headers are removably attached by flanged fitting assemblies 20 to the wall of the electrical transformer 21. However, the improvement of FIGS. 1–5 also contemplates a permanent welded connection of the headers to the transformer.

As perhaps best illustrated in FIG. 4, component stamped sheet metal plates 22, 23 of each plate member or assembly 13, as marginally seam-welded to one another, are formed to provide the opposed, generally semi-circular, outwardly bulged embossments 24 directly adjoining outwardly flared semi-circular weld lips or flanges 25 in which the slotted surfaces of the headers 11, 12 are nested and welded in a flush surface contacting relationship of said flanges and headers radially outwardly of and between the latter. This affords, in each plate assembly, a wide arcuate upper intake mouth 26 (FIG. 3) and an equally large discharge mouth 27 in direct communication, respectively, with enlarged communicating slots 18 of the respective headers 11, 12. Thus, copious volume is provided for the entry and exit of the liquid coolant into and out of the plate assemblies 13.

Directly adjoining the respective mouths 26, 27 the plates 22, 23 are stamped to offset the same inwardly (or toward one another in the assembly) at 28, thus affording in the assembly further manifold throats 29, 30, substantially co-extensive with, or at least extending across a major part of, the effective breadth of the plates between their welded side flanges 31, which throats are in communication with the respective intake and discharge mouths 26, 27.

In a transverse, horizontally extending zone, generally designated 32 (FIG. 2), between the throats, it has further been found desirable to form the plates 22, 23 by stamping the latter across the breadth thereof between flanges 31, or a major part thereof, in a rippled or corrugated pattern 33 which best appears in FIGS. 2 and 5. Thus, there are provided corrugated passage zones 34 of increased internal and external surface areas at the intermediate zone 32. The effect of such increased corrugating is to increase convective heat transfer.

If desired and for improved rigidity, the ripple or corrugated zone 32 may be sub-divided into two or more sections by fully indenting the plates 22, 23 at one or more vertically extending sub-zones 36, so that in such zone or zones the plates may have abutting engagement with one another and may, if desired, be welded together.

The characters A, B and C apearing in FIG. 4 are used to designate certain dimensional characteristics which are detailed at some length in the specification in the Yoder et al patent identified above, but which are not germane to the present invention.

As typically practiced in treating a welded header and plate arrangement such as that of the Yoder et al patent identified above, a thorough shot or grit blasting of the interior of opposed headers of the unit is carried out, using an appropriate shot or grit size, air blast pressure and time interval as determined by the thickness or severity of the scaling, the area involved, and like more or less obvious factors. This is, as indicated above, essential in ridding the interior header or other surface of the inevitable oxide incrustation. This commences very quickly to accumulate, being initially and typically in the form of a brown rust, which persists and increases even if the surface has been wire-brushed or pickled.

As a specific example, in treating each 4 ½ inches i.d. header of a standard Yoder et al.-type unit, the interior of said header surface will be blasted, with the assistance of an appropriate fixture, at 90 p.s.i. with conventional size G–4 iron particles for approximately 4 minutes. Immediately following this the header-connecting transfer plates, as unitarily pre-welded, are straddled over communicating side openings of the respective plates and, using usual normal weld settings, welded in place from the exterior and perimetrally of the straddled plate ends and said openings. Reference may be had to FIGS. 21–25, inclusive, of Yoder et al. U.S. Pat. No. 3,153,447 for further disclosure of the nature of the joint (see also FIGS. 6 and 7), typical of others contemplated for production under the method of the invention.

Thus, under the above-described aspect of said invention the internally exposed surface is restored by blasting to its white metal condition, mechanically cleaning it of grease, dirt, oil, various foreign matters and the prior scale; and as an inherent consequence of this operation the exposed and cleaned surface is roughened to a degree to increase its total area by a factor of some 50–60 percent. This affords a much larger area to dissipate quickly the heat evolved during welding. The thus-attained optimum conditions of temperature and time necessarily diminish the amount of free oxygen generated and contributing to the formation of residual scale. That is, absent the blasting if the ultimate oxide formed in welding is distributed over a given area, its total thickness per unit of that area may well be such that undesirable, loose or flaky scale is inevitably formed. However, by blasting this same amount of mass is distributed over a 50–60 percent larger area. Not only is its thickness proportionately reduced, but also the relatively erose, nodular or saw-tooth surface effect affords in any event a much more tight adherence of the minimum weld oxide scale than is possible at an untreated or inefficiently treated surface. Experience has shown that the shot or sand blasting to thoroughly clean and roughen the surface prevents the occurrence of approximately 90 percent of the oxide that would normally form in welding. The remaining 10 percent was further reduced in the above instance by using an argon or equivalent inert gas purge of the header interior during welding, as later referred to.

With respect to the temperature of the oxidizing surface, the only way to reduce it is to reduce the heat input during welding, and this is not practical, because without a certain level of heat input the weld joint is not homogenous, lacking proper penetration, and gives what is commonly known in the industry as a "cold weld."

As a desirable option in many instances, a secondary approach to the reduction of available free or ambinet oxygen at the time of welding is by way of the above-mentioned purge, in which a slight amount of argon is introduced during welding. In the typical above example a small amount of the gas was introduced at the rate of about 10 cubic feet per hour.

Since argon is heaver than air, it tends to displace air in the header, thereby reducing the available free oxide necessary. Oxygen will enter the header interior even if the parts are tighly clamped in a welding fixture; and the argon presence contributed materially to reduction of the 10 percent oxide residual referred to in the third preceding paragraph. Coincidentally, it has been observed that the preferred shot-blasting, as specifically distinguished from other types of grit blasting particulate, results in a reduction in the amount of argon needed for its purpose.

What is claimed is:

1. A method of weld-uniting a pair of hollow metal components of a heat transfer plate unit to leave a minimum of oxidized weld scale residue to one thereof, said one of which components being a hollow header of said unit presenting an interior surface along which a heat transfer liquid is to flow, comprising abrasively blasting the internally exposed surface area of said header component, including the zone of the desired weld union, to thoroughly cleanse said area of foreign matter including prior-occasioned scale or similar incrustation, and to abrasively roughen said area, engaging a surface of the other hollow component in face-to-face contact with the external surface of said one component at an external area of the latter corresponding to at least a part of said internally blasted surface opposed to said zone, and proceeding to weld said components at said external area.

2. The method of claim 1, in which welding to complete said union is performed in an at least partially oxygen-purged atmosphere internally of said hollow header unit.

3. The method of claim 1, in which said abrasive blasting of said area is to an extent to increase the overall effective exposure of said roughened area in the order of 50–60 percent.

4. The method of claim 1, in which said abrasive blasting of said area is a metal shot blasting to an extent to increase the overall effective exposure of said roughened area in the order of 50–60 percent.

5. The method of claim 2, in which said abrasive blasting of said area is a metal shot blasting to an extent to increase the overall effective exposure of said roughened area in the order of 50–60 percent.

6. The method of claim 5, in which said purged atmosphere is an argon-laden one.

7. The method of claim 1, in which said face-to-face contacting surface of said other hollow component has an arcuately straddling interfit over said external surface of said one component in covering relation to a side opening of the latter in being weld-united thereto.

8. The method of claim 2, in which said face-to-face contacting surface of said other hollow component has an arcuately straddling interfit over said external surface of said one component in covering relation to a side opening of the latter in being weld-united thereto.

9. The method of claim 3, in which said face-to-face contacting surface of said other hollow component has an arcuately straddling interfit over said external surface of said one component in covering relation to a side opening of the latter in being weld-united thereto.

10. The method of claim 4, in which said face-to-face contacting surface of said other hollow component has an arcuately straddling interfit over said external surface of said one component in covering relation to a side opening of the latter in being weld-united thereto.

* * * * *

UNITED STATES PATENT OFFICE
CERTIFICATE OF CORRECTION

Patent No. 3,849,851          Dated November 26, 1974

Inventor(s)  Kenneth L. Kaltz

It is certified that error appears in the above-identified patent and that said Letters Patent are hereby corrected as shown below:

Col. 5, line 31 (line 3 of Claim 1 - application Claim 2, line 4), "to" should be changed to -- in -- .

Signed and sealed this 4th day of February 1975.

(SEAL)
Attest:

McCOY M. GIBSON JR.
Attesting Officer

C. MARSHALL DANN
Commissioner of Patents